United States Patent [19]

Cox

[11] Patent Number: 5,351,824
[45] Date of Patent: Oct. 4, 1994

[54] CASSETTE BOX HOLDER

[76] Inventor: D. Sherman Cox, 4 Chipper Rd., St. Louis, Mo. 63128

[21] Appl. No.: 71,258

[22] Filed: Jun. 4, 1993

[51] Int. Cl.⁵ ............................................. B65D 55/02
[52] U.S. Cl. .................. 206/387; 206/45.14; 206/807
[58] Field of Search .................. 206/45.14, 387, 807, 206/814

[56] References Cited

U.S. PATENT DOCUMENTS

| | | | |
|---|---|---|---|
| 3,550,769 | 12/1970 | Wolk | 206/78 |
| 4,381,836 | 5/1983 | Rivkin et al. | 206/387 |
| 4,383,607 | 5/1983 | Lordahl et al. | 206/45.34 |
| 4,558,782 | 12/1985 | Iverson et al. | 206/387 |
| 4,572,369 | 2/1986 | Morris | 206/387 |
| 4,760,914 | 8/1988 | Gelardi et al. | 206/387 |
| 4,771,888 | 9/1988 | Lundeen | 206/387 |
| 4,834,236 | 5/1989 | Buelens et al. | 242/71.1 |
| 4,834,238 | 5/1989 | Hehn et al. | 206/387 |
| 4,865,190 | 9/1989 | Gregerson et al. | 206/309 |
| 4,881,645 | 11/1989 | Smiler et al. | 206/387 |
| 5,215,189 | 6/1993 | Weisburn et al. | 206/387 |

*Primary Examiner*—Paul T. Sewell
*Assistant Examiner*—Marie Denise Patterson
*Attorney, Agent, or Firm*—Grace J. Fishel

[57] ABSTRACT

A cassette box holder for a conventional type cassette box has a unitary body and a closure plate. The unitary body has a chamber with a planar top for the cassette box and an attached tab. The tab has a ridge which rises out of the plane of the tab and is angled towards the planar top of the cassette box. The ridged tab renders the cassette box holder resistant to folding and facilitates proper placement of the cassette box holder in display box.

8 Claims, 2 Drawing Sheets

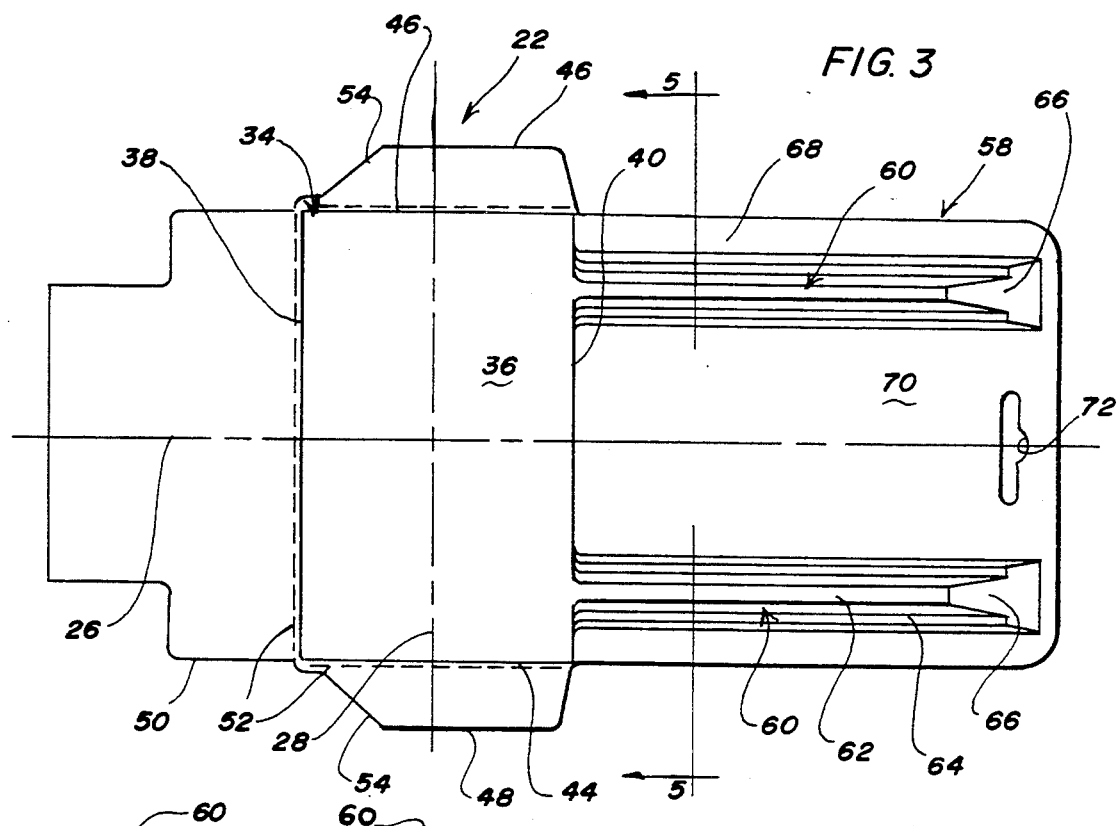
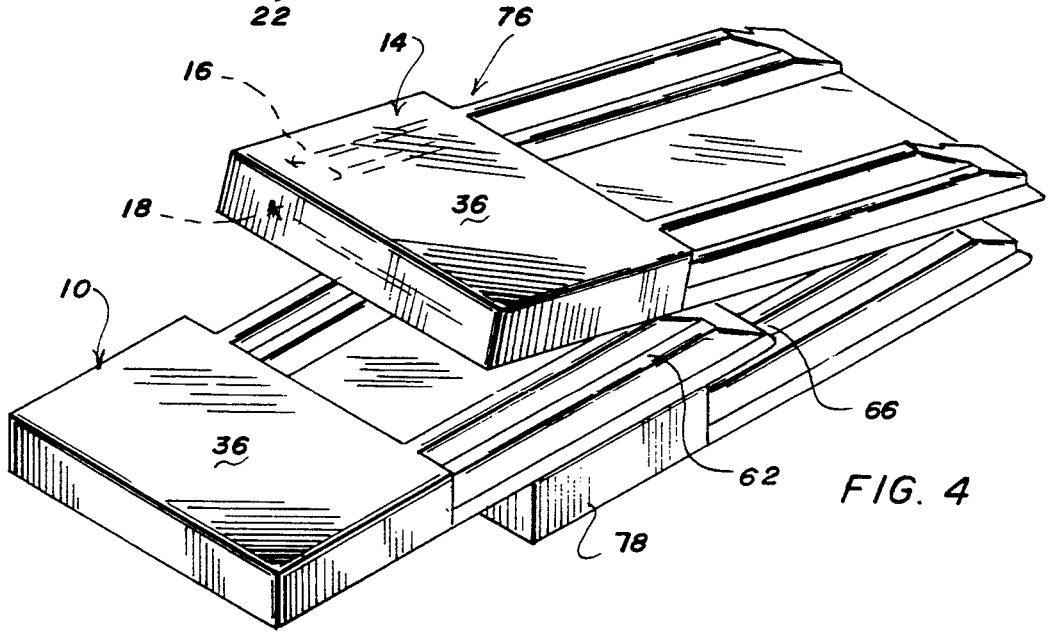

CASSETTE BOX HOLDER

BACKGROUND OF THE INVENTION

1. Field of the Invention

The present invention relates to an inexpensive cassette box holder which renders a cassette less susceptible to theft at point of sale and which furthers proper placement in a display box.

2. Brief Description of the Prior Art

Audio tape cassettes are packaged by recording companies in a clear plastic, two part box-like container that is slightly larger than the cassette itself and carries in addition to the cassette, a printed cardboard insert that can be viewed through the container. The cardboard insert has a front panel which is visible through the top of the box, a side panel and a back panel. The title of the album is on the front panel frequently accompanied with a picture of the recording artist. The title of the album and the name of artist is repeated on the side panel and the program for each side of the cassette is listed on the back panel. The cassette box may be overwrapped in a clear plastic film.

A cassette box is approximately 3"×4"×½ and is easily hidden by a shoplifter in a pocket or purse. Cassettes are now inexpensive enough that they are sometimes offered for sale as an impulse item in convenience markets, drug stores and so forth. The problem of theft is so significant that many such stores refuse to sell cassettes unless they are displayed on a rack at the checkout counter where they can be watched by a clerk. There are many items competing for space at the checkout counter and more cassettes could be sold if there were an inexpensive way to display them in a manner that makes them less susceptible to theft.

In the impulse market, a stack of mixed cassettes is often offered for sale in a point of sale box or crate. Sometimes a shopper will remove a packaged cassette from the display to read the cardboard insert and decide to put it back. Since the shopper is not highly motivated to take care of the display, sometimes the cassette is reshelved with the side panel of the cardboard insert facing outwardly where it can be read by the next customer and sometimes it is not. Unless the title is visible, the cassette will not be purchased and a messy display may discourage other shoppers from looking. More cassettes could be sold if they were packaged in a manner which facilitates reshelving of the cassette in a proper orientation.

SUMMARY OF THE INVENTION

In view of the above, it is an object of the present invention to provide an inexpensive cassette box holder that is larger than a cassette box and resistant to folding such that a cassette stored in the holder is less susceptible to theft. It is another object to provide a cassette box holder which furthers proper placement of the holder in a display box such the side panel of the cardboard insert is visible. Other objects and features of the invention will be in part apparent and in part pointed out hereinafter.

In accordance with the invention, a cassette box holder comprises a unitary body and a closure plate. The body has a longitudinal axis and a top surface and a bottom surface. A generally rectangular chamber for a cassette box is formed in the body. The chamber has a substantially planar top wall joined at its edges to a top edge of side and end walls and opens on the bottom surface of the body along a bottom edge of the side and end walls. A substantially planar tab is formed in the body and is attached to the bottom edge of one chamber side wall. The tab has at least one ridge which is generally parallel to the longitudinal axis of the body, rises out of the plane of the tab and is angled towards the plane of the top wall for stiffening the tab. The closure plate closes the chamber at the bottom surface of the body. In use, the ridged tab renders the cassette box holder resistant to folding perpendicular to its longitudinal axis so that a cassette stored in the chamber is less susceptible to theft and the ridged tab furthers proper placement of the cassette box holder in a display box.

The invention summarized above comprises the constructions hereinafter described, the scope of the invention being indicated by the subjoined claims.

BRIEF DESCRIPTION OF THE DRAWINGS

In the accompanying drawings, in which one of various possible embodiments of the invention are illustrated, corresponding reference characters refer to corresponding parts throughout the several views of the drawings in which:

FIG. 3 is a top plan view of the body portion of the cassette box holder;

FIG. 4 is a perspective view of the cassette box holder being reshelved in a stack of similar cassette box holders; and, FIG. 5 is a section taken along line 5—5 in FIG. 3.

DETAILED DESCRIPTION OF THE INVENTION

Figure 1:
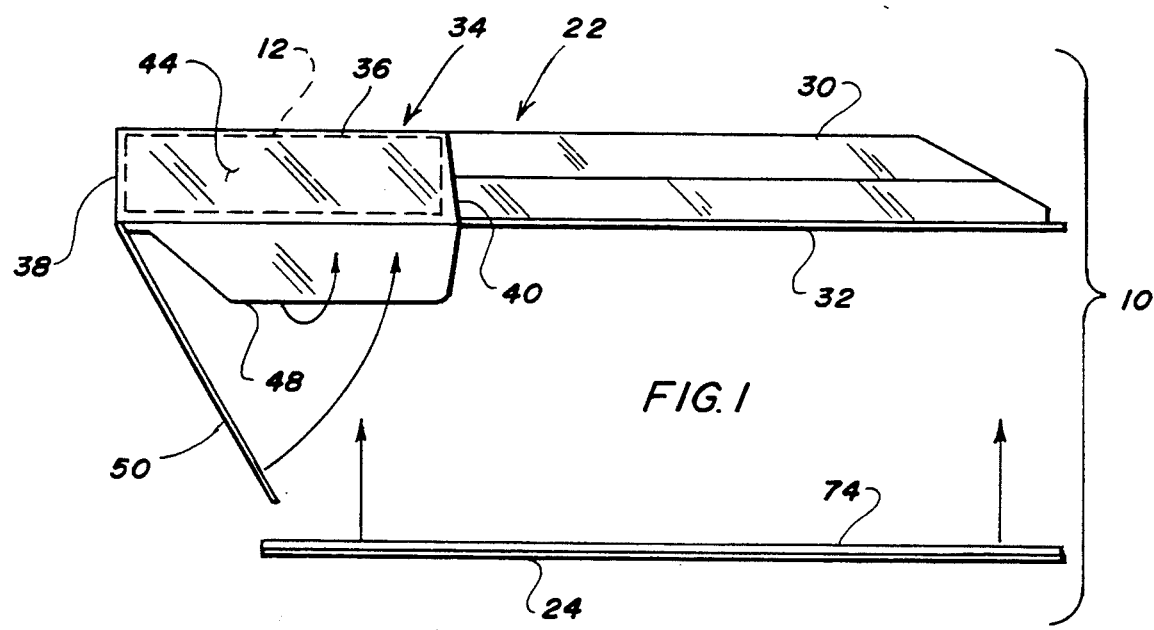
FIG. 1 is an exploded side elevational view of a cassette box holder including a body and closure plate in accordance with the present invention.

Referring to the drawings more particularly by reference character, reference numeral 10 refers to a cassette box holder in accordance to the present invention. Cassette box holder 10 holds a cassette box 12 in which a cassette tape is stored. Cassette box 12 is of a conventional type and has a printed cardboard insert 14 enclosed with the cassette tape. Insert 14 has a front panel 16 which is visible through the top of cassette box 12, a side panel 18 and a back panel 20. The title of the album and name of the artist is usually written on side panel 18.

In major part, cassette box holder 10 has a unitary body 22 and a closure plate 24. Body 22 has a longitudinal axis 26, a lateral axis 28, a top surface 30 and a bottom surface 32. Bottom surface 32 preferably forms a generally rectangular footprint. As best seen in FIGS. 1 and 3, a rectangular chamber 34 for cassette box 12 is formed at one end of body 22 with its longitudinal axis transverse longitudinal axis 26 of holder 10. Chamber 34 is sized to accept cassette box 12 and has a substantially planar top wall 36 joined at its edges by side walls 38, 40 and end walls 42, 44. Chamber 34 opens at bottom surface 32 along a bottom edge of the side and end walls.

Side wall 38 and end walls 42, 44 extend at substantially right angles to said planar top whereas side wall 40 flares outwardly as seen in FIG. 1. This slight taper makes the base of chamber 34 somewhat larger than the top of cassette box 12 and facilitates insertion of cassette box 12 into the holder. Right and left trapezoidal flaps 46, 48 are attached to end walls 42, 44 opposite top wall 36 and a T-shaped flap 50 is attached to the bottom edge of side wall 38. A line of perforations 52 is formed at the base of flaps 46, 48 and 50 to facilitate folding as shown in FIG. 1. Non-parallel sides 54 of trapezoidal flaps 46, 48 are sloped towards side wall 38 to form a mitered corner 56.

A substantially planar, rectangular tab 58 is formed in body 22 and is attached to chamber 34 along the bottom edge of side wall 40. Tab 58 has at least one ridge 60 generally parallel to longitudinal axis 26 that rises out of the plane of tab 58 and is angled towards the plane of top wall 36. In the form illustrated in FIGS. 1, 3 and 5, a pair of parallel spaced apart ridges 60 are provided. Ridges 60 have a top wall 62 that is coplanar with top wall 36 of chamber 34 and side and end edges. The side edges of each ridge 60 are joined to stepped, outwardly flared side walls 64. Top wall 62 merges with top wall 36 of chamber 34 at one end of the ridge and joins at a dihedral angle with an end wall 66 at the other end. Ridges 60 are spaced inboard of the side edges of tab 58 such tab 58 forms a flange 68 at the base of side walls 64 and end wall 66 and a web 70 interconnecting the base of the ridges. An aperture 72 is provided in tab 58 opposite chamber 34 to receive a retail display rod for use in one mode of retail display.

Figure 2:
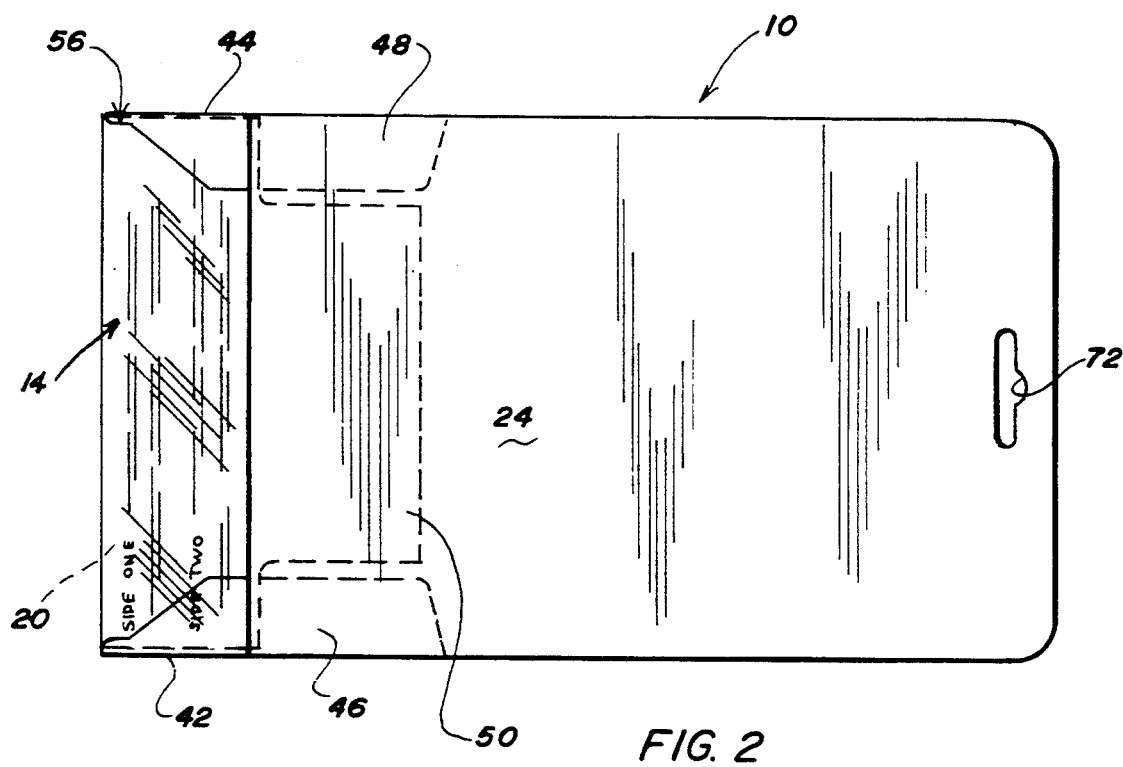
FIG. 2 is a bottom plan view of an assembled cassette box holder.

Closure plate 24 is provided for closing chamber 34 at bottom surface 32 of body 22. Closure plate 24 preferably conforms to the footprint of body 22 but is shorter along its longitudinal axis such that back panel 20 of package insert 14 is visible through folded over side and end flaps. In the form shown in FIGS. 1 and 2, plate 24 is attached to body 22 along flange 68, across web 70 and to inboard ends of side flaps 46, 48 and end flap 50.

While cassette box holder 10 is illustrated with chamber 34 sized for receipt of one cassette box 12, it will be understood that the chamber may have a depth for receipt of more than one cassette box. Similarly, the width or length of chamber 34 may be arranged such that two or more cassette boxes are received side-by-side or end-to-end.

Body 22 is preferably thermoformed along with a plurality of other bodies from a sheet of clear plastic material or the like. The thermoforming process is well known in the art and basically involves vacuum-forming or molding a heated sheet of plastic material, typically a thin, flexible, easily folded plastic material, into a mold, allowing it to set and then removing it from the mold. Suitable materials for this purpose include polyvinyl chloride having a thickness from about 8 to 15 mils and entirely satisfactory results have been obtained with sheets of polyvinyl chloride only 9 mils thick. Thicker material (i.e., over 15 mils) can be used but is more expensive and unnecessary. After the plastic has been removed from the mold, the outer edges of body 22 are trimmed and perforations 52 cut in a die-cutting operation, as is known in the art. Body 22 can then be nested with other bodies, such that a large number of bodies can be shipped and stored in relatively little space.

Closure plate 24 may be printed with an advertising message and is preferably die cut from a sheet of cardboard. For expediency, the message is generic to a group of cassettes (e.g., all those pre-priced at $5.99 and so forth) such that the plate does not have to be matched to a particular recording thus simplifying assembly of cassette box holder 10. An adhesive 74 is applied to closure plate 24 for attachment to body 22 as described above. Preferably the adhesive is of a type that is passive prior to sealing of cassette box holder 10 such that it can be applied to the sheet of cardboard before the plates are die cut and such that a stack of plates can be stored without sticking together. Such an adhesive advantageously comprises a dry film that is heat sealed to body 22 after cassette box 12 is put in chamber 34.

In use, cassettes can be offered for sale in cassette box holder 10 either hung on a display rod or in a point of sale box or crate. When they are sold in a box, a shopper is more likely to put cassette box holder 10 back with side panel 18 facing outwardly. This is because cassette box holder 10 is weighted towards the cassette end and a person tends to hold a package at its center of gravity while the graphics on front panel 16 favor holding it right side up. Starting from this natural position as shown in FIG. 4, sloped end wall 66 allows cassette box holder 10 to be easily slipped between similar upper and lower cassette box holders 76, 78. During reshelving, upper cassette box holder 76 cams up sloped end wall 66 and then slides along top wall 36 until the cassette box holder being inserted is stopped by the back wall of the display box at which point cassette box holders 10, 76 and 78 are lined up. Side panels 18 are visible and the display is neat.

In addition to favoring proper placement in a display box, cassette box holder 10 is resistant to folding perpendicular to longitudinal axis 26 and the cassette box cannot be removed from the holder without mutilating the package. Cassette box holder 10 is less susceptible to theft because it is too big to be easily hidden in a pocket or purse. It can therefore be offered for sale out of view of a store clerk and need not be near the checkout counter.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A cassette box holder for holding a cassette box containing a cassette comprising a unitary body and a closure plate, said body having a longitudinal axis and a top surface and a bottom surface, a generally rectangular chamber for a cassette box formed in said body having a substantially planar top wall joined at its edges by side and end walls, said chamber side and end walls opening on the bottom surface of the body, a substantially planar tab formed in said body attached to one of the side walls, said tab having at least one ridge with first and second ends and a top wall coplanar with the top wall of the chamber, said ridge generally parallel to the longitudinal axis of the body and running substantially the length of the tab, said ridge merging with the top wall of the chamber at its first end and rising out of the plane of the tab and sloped towards the top wall of the chamber at its second end;

said closure plate closing the chamber at the bottom surface of the body whereby the cassette box holder is resistant to folding perpendicular to its longitudinal axis such that the cassette is less susceptible to theft and the ridge furthers proper placement of the cassette box holder in a display box.

2. The holder of claim 1 wherein a side flap is attached to each of the end walls of the chamber and an end flap is attached to the second of said side walls, said side and end flaps folded over the cassette box.

3. A cassette box holder for a cassette box containing a cassette and an insert with a front panel, side panel and back panel which are visible through the cassette box, said cassette box holder comprising a unitary body and a closure plate, said body formed of a transparent plastic material, having a longitudinal axis, a top surface and a bottom surface and having a generally rectangular footprint, a generally rectangular chamber for a cassette box forming a first end of said body, said chamber having a substantially planar top wall joined at its edges to a top edge of side and end walls, said chamber opening on the bottom surface of the body along a bottom edge of the side and end walls, a substantially planar tab forming a second end of said body and attached to the bottom edge of one of the side walls, said tab having a pair of spaced apart ridges generally parallel to the longitudinal axis of the body, said ridges having first and second ends and a top wall coplanar with the top wall of the chamber, said ridge merged with the top wall of the chamber at its first end and rising out of the plane of the tab and sloped towards the top wall of the chamber at its second end, a side flap attached to the bottom edge of each end wall and and end flap attached to the bottom edge of the other one of the side walls, said side and end flaps folded over the cassette box said closure plate shorter than the body along its longitudinal axis so that the back panel of the insert is visible through the folded side and end flaps, said closure plate adhesively secured to the bottom surface of the body whereby the cassette box holder is resistant to folding perpendicular to is longitudinal axis such that the cassette is less susceptible to theft and the ridge furthers proper placement of the cassette box holder in a display box.

4. The holder of claim 3 wherein the side walls of the ridges are stepped and outwardly flared.

5. The holder of claim 4 wherein the tab forms a flange running along the sidewalls and sloped end walls of the ridges and a web between the flanges.

6. The holder of claim 5 wherein the side wall of the chamber attached to the tab is slighted flared to facilitate insertion of the cassette box into the chamber.

7. The holder of claim 6 wherein perforations are provided in the side and end flaps to facilitate folding.

8. The holder of claim 7 wherein the body is thermoformed from a sheet of polyvinyl chloride having a thickness from about 8 to 15 mil and wherein the closure plate has an adhesive layer that is thermosealed to the body along the flange, across the web and to inboard portions of the side and end flaps.

* * * * *